Figure 1:
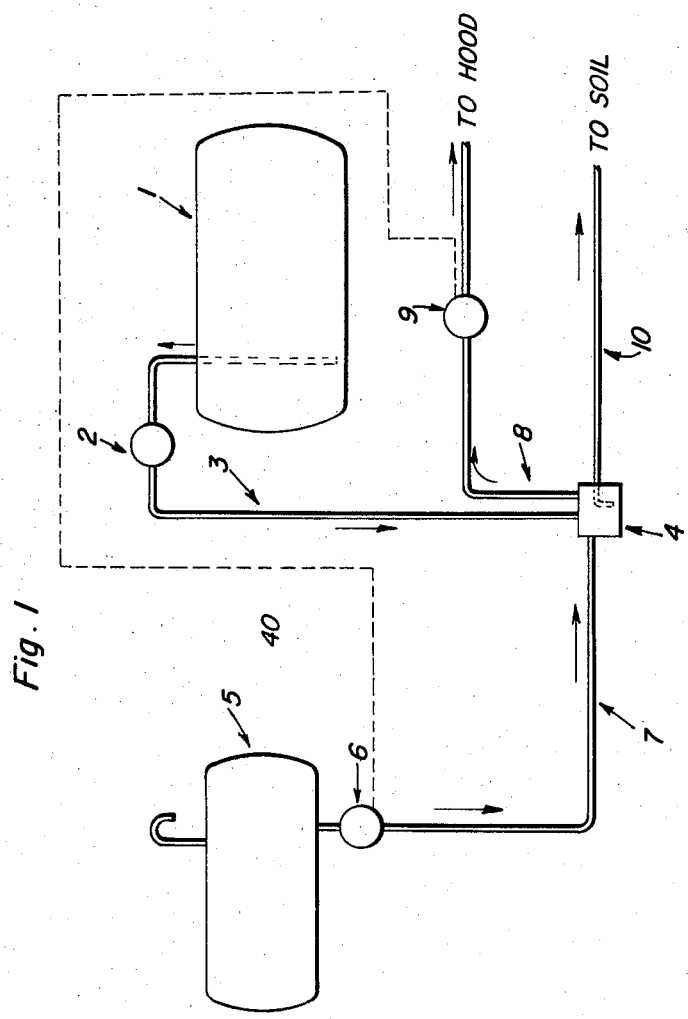

William J. Haude
Harry L. Mahl, Jr.
INVENTORS

BY *Kenneth E. Prince*

ATTORNEY

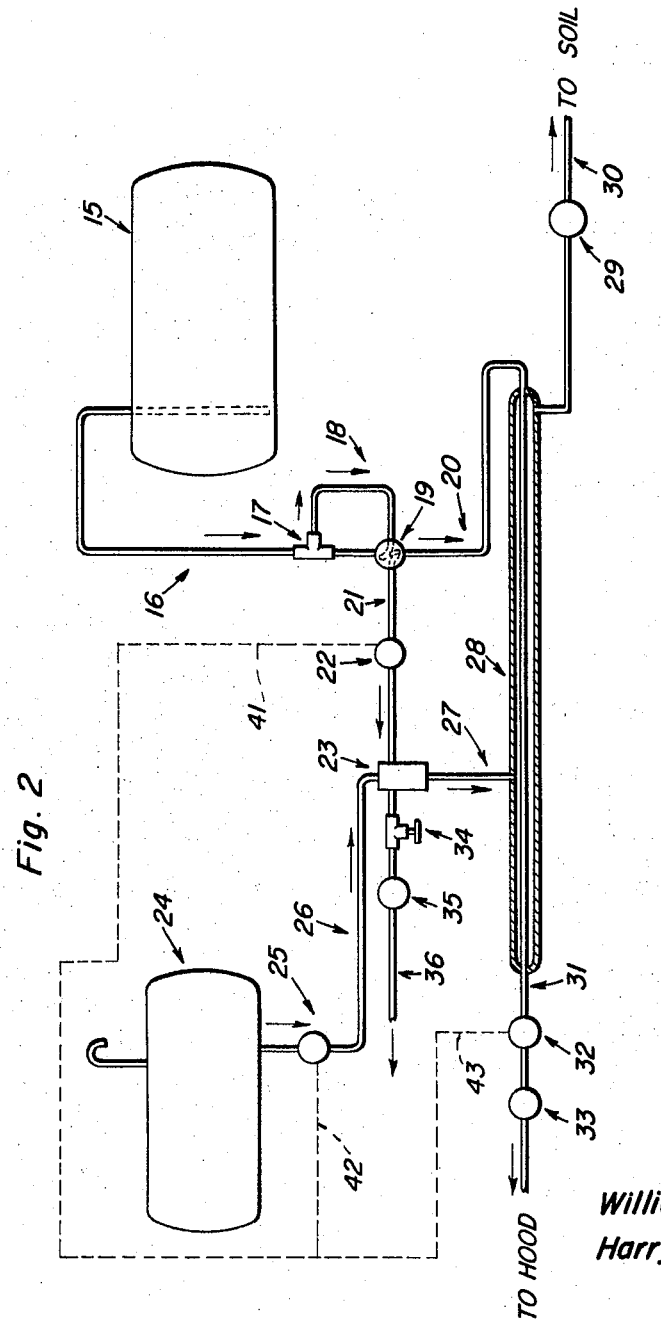

3,250,597
APPARATUS FOR USING AMMONIA VAPOR IN FERTILIZING AND DEFOLIATING PLANTS
Harry L. Mahl, Jr., Wilmington, N.C., and William J. Haude, Sands Point, N.Y., assignors to W. R. Grace & Co., New York, N.Y., a corporation of Connecticut
Filed May 17, 1963, Ser. No. 281,099
2 Claims. (Cl. 23—259.1)

This invention relates to the vaporization of liquid ammonia. In one specific aspect it relates to the vaporization of liquid ammonia to produce gaseous ammonia suitable for use in treating row crops while concomitantly producing a nitrogen fertilizer suitable for direct application to the soil.

In summary, this invention involves a portable heat exchanger that uses heat produced by chemical reactions of ammonia with an ammonia-reactive material to vaporize liquid ammonia and to superheat the resulting gas to about 20–50° C. without cracking said ammonia. The resulting ammonia vapor is suitable for defoliating row crops when discharged into the hood of an ammonia defoliator as the defoliator moves lengthwise along the crop row. In one particular aspect of this invention, heat for vaporizing ammonia is generated by neutralizing an aqueous solution of an acid with liquid anhydrous ammonia; the resulting solution of an ammonium salt of the acid is applied to the soil as fertilizer, and the ammonia vapor is used to treat row crops. Alternatively, the resulting ammonia-ammonium salt-water mixture may be blown in the form of a mist or fog into the hood of an ammonia defoliator as the defoliator moves lengthwise along the crop row. In another aspect of this invention, the heat is generated by adding liquid ammonia to a solution of hydrogen peroxide. This induces the exothermic decomposition of hydrogen peroxide to water and oxygen. The thus produced water, with some ammonia dissolved therein, is applied to the soil as fertilizer. In the embodiment of this aspect of our invention that uses direct heating, the oxygen is mixed with the ammonia vapor that is applied to the crop row. In another embodiment which uses indirect heating, the oxygen is vented to the atmosphere. Our invention makes it possible to feed ammonia continuously or intermittently into the hood of a contacting device at constant or variable rates ranging from about 2 pounds per acre to upwards of about 300 pounds per acre while moving the contacting device lengthwise along a crop row. This flexibility makes it practical to add ammonia vapor to row crops, on a commercial scale, for such diverse purposes as defoliation and foliar fertilization.

Preferred embodiments of our invention are illustrated in the following drawings:

FIGURE 1 presents a flow sheet of one of our preferred methods for vaporizing liquid ammonia. Excess liquid ammonia from cylinder 1 passes via flow regulator 2 and line 3 to a reactor, or reaction chamber, 4 where it contacts an aqueous solution of acid supplied from storage tank 5 via flow regulator 6 and line 7. An exothermic reaction between ammonia and the acid occurs in chamber 4. This results in the formation of a solution of the ammonium salt of the acid and vaporization of the excess ammonia. The thus produced ammonia vapor, which is saturated with water, leaves reactor 4 via line 8. Said ammonia vapor passes through temperature regulator 9 into the hood of an ammonia defoliator (not shown) as the hood is moved lengthwise along a crop row. Regulator 9 controls the temperature of ammonia vapor exiting chamber 4 by activating acid regulator 6 via conventional connecting means 40. We prefer to keep the temperature of said ammonia vapor in the range of about 27–38° C. The solution of ammonium salt produced in reactor 4 contains some dissolved ammonia. This solution leaves reaction chamber 4 by line 10 which carries said solution to the soil where its nitrogen content is absorbed and used as fertilizer. Alternatively, a concentrated solution of hydrogen peroxide may be used as ammonia reactant in place of the acid solution. When using hydrogen peroxide, the material leaving reaction chamber 4 through line 8 is a gaseous mixture of ammonia and oxygen that is saturated with water vapor. With said peroxide feed, the material leaving chamber 4 through line 10 is an aqueous solution of ammonia.

FIGURE 2 presents a flow sheet of another preferred method for vaporizing ammonia by our process. Liquid ammonia from cylinder 15 passes through line 16 to T 17 where part of the ammonia passes via line 18 into the tubes of heat exchanger, or subcooler, 19 and thence by line 21 through flow regulator 22 to a reactor, or reaction chamber, 23 where it reacts with a stoichiometrically equivalent quantity of acid solution added from tank 24 via flow regulator 25 and line 26. The hot solution from reactor 23 passes through line 27 to the shell of heat exchanger 28 and then via pressure regulator 29 and line 30 to the soil where it is absorbed and its nitrogen content used as fertilizer. Flashing anhydrous ammonia passes from T 17 via the shell of subcooler 19 and line 20 to the tubes of heat exchanger 28, and dry superheated ammonia vapor leaves the tubes of heat exchanger 28 and passes, via line 31, through temperature regulator 32 and flow regulator 33 to the hood of an ammonia defoliator (not shown), as the defoliator moves lengthwise along a crop row. We prefer to keep the temperature of ammonia vapor exiting heat exchanger 28 in the range of about 27–38° C. Alternatively, a concentrated aqueous solution of hydrogen peroxide may be used in place of acid as the ammonia reactant in our process. When this is done, oxygen produced in reactor 23 is vented to the atmosphere via valve 34, flow regulator 35, and line 36. With hydrogen peroxide as ammonia reactant, the material leaving the heat exchanger's shell via line 30 is an aqueous solution of ammonia.

The ammonia vaporizer of this invention is of special utility on tractor-mounted ammonia defoliators, such as those used for the defoliation of cotton and other row crops, such defoliators are well known and can be readily modified to use the heat exchanger of this invention.

In the ammonia defoliation of row crops it is extremely important to deliver ammonia at a steady, pre-determined rate and at a pre-determined temperature. Otherwise defoliation will be erratic and/or overly expensive. The advantages of defoliation equipment capable of these functions will be best understood in the light of the present status of chemical defoliation, as discussed below.

Leaves on the stalks of row crops and on weeds growing with these crops are a handicap to harvesting, because leaves and leaf juices interfere with the functioning of mechanical harvesters and cause the accumulation of trash in the harvested crops. As a result, considerable interest has developed in the defoliation of row crops before harvesting. Defoliation of cotton has received the most attention with the result that cotton defoliation has become a matter of great economic importance. The defoliation of other row crops, especially soybeans, including weeds growing in the bean fields, is receiving increased attention.

In the commercial growing of cotton it has been necessary to make several pickings by hand, because all the bolls do not ripen at the same time. Bolls on the lower branches mature first, and opening of bolls on the upper branches occurs over a period of several weeks after the lower bolls have matured. In recent years, the shortage and cost of labor and the trend toward large scale farming have made mechanical picking very desirable. The presence of leaves on cotton stalks is an especially severe handicap to mechanical harvesting, because leaves present a barrier which hampers the picking means from reaching the bolls, and to add trash to the cotton. Also, if green leaves are rubbed against the cotton, juices are exuded and stain the cotton fibers. Thus, it is highly desirable that the leaves be removed from cotton plants before harvesting the crop mechanically.

If the leaves of a plant are injured by physical or chemical means, or if they are cut leaving stems, abscission layers of cells grow across the petiole bases causing the leaves or leaf stems to drop off. In the case of cotton, the formation of abscission layers disrupts the metabolic processes of the plants and causes the upper bolls to ripen and open more rapidly, thereby facilitating the use of mechanical pickers.

Although cotton defoliation is of special value when mechanical pickers are used, it also aids hand picking, because the dew dries out quicker permitting the pickers to get an earlier start, and it is easier for the pickers to locate the bolls and gather the cotton when the plants are free of leaves.

Leaf removal also helps control insects. This is particularly true in respect to aphids, leaf worms, and boll weevils. Since defoliation speeds up cotton harvesting, the stalks can be destroyed earlier. This is advantageous in areas that have plow-up programs to aid in the control of boll weevils.

To obtain the best results with cotton, the boll load should be heavy and vegetative development stopped. Normally, about 50%–70% of the bolls should open before a chemical defoliant is applied. Practically no damage to the crop will occur if most of the bolls are full size and firm to the touch at the time of defoliation. If the bolls are not full size and are soft when the plants are defoliated, the yield may be reduced and seed and fiber quality may be lowered.

At the present time most defoliants are contact herbicides which cause defoliation when applied at low rates. At slightly higher rates these materials produce rapid desiccation and killing of leaves, stems, and other plant parts before the abscission layers form. Desiccation is very objectionable with cotton, because leaves of dead plants set so firmly that few of them drop, boll development ceases, abscission of the bolls occurs, and the plants' stems become brittle so that bolls are easily broken off and lost during harvesting. When legumes are desiccated, large numbers of seed pods drop off. Cyanamide compounds, organic phosphorus compounds, arsenic compounds, and chlorates are the principal defoliants used at the present time. Cyanamide is difficult to use because it requires a considerable amount of dew or other moisture. Practically no defoliation occurs when this material is applied in the absence of moisture. Arsenic and phosphorus compounds are poisonous, and chlorates leave phytotoxic residues in the soil. Furthermore, irregular defoliation is obtained with these materials, and defoliation is seldom more than about 60–75% complete. There is known the treatment of cotton plants with hot combustion gases to produce defoliation. A process of this type is extremely difficult to use, because the temperature must be controlled very closely. If the gas is too cool, little or no defoliation will be obtained; if it is too hot, desiccation or boll abscission will result. Various devices have been suggested for mechanically removing foliage from cotton plants. Although the use of such devices increases the efficiency of cotton picking to a limited extent, only partial defoliation has been obtained with these machines.

It is an object of the present invention to provide a means for defoliating row crops after the crop is made, whereby the plants and weeds growing with them will be rendered substantially free of leaves so that the crops may be harvested mechanically or by hand to yield products that contain little trash and are free of leaf stain.

It has recently been discovered that contact with gaseous ammonia will cause the defoliation of plants. However, previous attempts to defoliate plants with gaseous ammonia have been characterized by spotty results, an average defoliation of about 75%, and high ammonia usage accompanied by a high ammonia loss. In addition to constituting a danger and annoyance to the operator requiring him to use a fresh air mask and protective clothing, the escaping ammonia was a hazard to all animal life and a hindrance to defoliation. In the experimental work leading to the design of this heat exchanger, it was found that ammonia enters plants through the stomata. It was also found that ammonia in concentrations too low to produce defoliation will close the stomata thus rendering the exposed plants insensitive to defoliation when contacted subsequently with ammonia in concentrations sufficiently high to defoliate normal plants. It was also found that the direct application of liquid ammonia to plant leaves burns the leaves at the point of contact but does not produce appreciable defoliation.

Ammonia, $NH_3$, is an article of commerce. Although this compound is a gas at normal temperature and pressure, it is stored and transported as a liquid in pressure vessels. Ammonia melts at $-77.70°$ C. and boils at $-33.35°$ C. at an absolute pressure of one atmosphere; its heat of vaporization is 283.6 calories per gram at $20°$ C. When heated to a sufficiently high temperature ammonia dissociates into hydrogen and nitrogen. The temperature at which dissociation commences depends upon the composition of the material with which the ammonia is in contact. In experimental work leading to the design of this ammonia vaporizer, it was found that ammonia is stable in the presence of type 304 stainless steel to temperatures of about $350°$ C. Hence, the maximum temperature, ca. about $250°$ C., obtained in our process is well below the threshold temperature for ammonia decomposition in the presence of type 304 stainless steel.

It has been discovered that previous poor defoliation was caused, in part, by improper temperature control in the ammonia vaporizing system. At times the temperature was too high with the result that a considerable portion of the ammonia was cracked to yield hydrogen and nitrogen which do not cause defoliation. At other times the vaporizer's temperature was too low. This resulted in incomplete vaporization of ammonia with the concomitant feeding of part of the ammonia as liquid which burns leaves at the point of contact but does not produce defoliation.

We have discovered a process for vaporizing ammonia which has overcome these difficulties. Our invention permits the continuous or intermittent feeding of gaseous ammonia into a contacting device at constant or variable rates ranging from as low as about two pounds per acre to upward of about 300 pounds per acre while the contacting device moves lengthwise along a crop row. The flexibility of our invention makes it practical to add ammonia vapor to row crops, on a commercial scale, for such diverse purposes as defoliation and foliar fertilization. Furthermore, this flexibility of control is necessary, because the ammonia feed must be cut off when turning at the end of rows and when stopping to service or repair the contacting system. So far as is known, there is no process available in the prior art for accomplishing these results.

The method which we prefer for defoliating row crops with ammonia comprises passing superheated gaseous ammonia prepared by our process into an elongated contacting zone, or hood, of conventional design while passing this device lengthwise along the crop row when the stomata are open. The plants are thereby exposed to a gas comprising a defoliating atmosphere of ammonia. Ammonia rates of about 40–120 pounds per acre have been satisfactory for defoliating row crops, while rates less than about 30 pounds per acre have failed to produce acceptable defoliation. Application at slightly lower rates, e.g., about 20 pounds or less per acre has been found to shock plants, thereby closing their stomata and rendering the shocked plants insensitive to defoliation. This period of insensitivity may last for 6–10 hours or longer. When defoliating cotton plants with gaseous ammonia under optimum conditions, leaves on plants exit the contacting zone are considerably lighter green than those of untreated plants. This indicates that ammonia attacks chlorophyll. Within about 15–30 minutes the treated leaves develop a bronze color, and in about 2–6 hours they feel dry when touched. After about 8–14 days substantially all of the leaves have dropped from the plants. This treatment does not kill the plants; new leaves develop in a few weeks.

The operation of our process is best illustrated with the aid of the accompanying drawings.

Using the preferred embodiment of our process illustrated in FIGURE 1, liquid ammonia from cylinder 1 passes through flow regulator 2 and line 3 to reaction chamber 4 where it contacts an aqueous solution of an ammonia-reactive material supplied from tank 5 via flow regulator 6 and line 7. The ammonia is added in excess—preferably about 4–6 equivalents of ammonia per equivalent of ammonia reactant. When said reactant is an aqueous solution of an acid, the ammonia and acid react exothermally to produce a solution of ammonium salt of the acid plus superheated ammonia vapor that is saturated with water. Said aqueous salt solution is saturated with ammonia. The thus produced ammonia vapor passes through line 8 and temperature regulator 9 to any conventional device (not shown) for contacting row crops with ammonia vapor. (The device shown in Farm Journal, Southwestern Edition, August 1961, page 32, is typical.) Temperature regulator 9 activates acid flow regulator 6—increasing the flow of acid when additional heat is needed and decreasing the acid flow when less heat is required. We prefer to keep the temperature of ammonia vapor exit reaction chamber 4 in the range of about 27–38° C. The ammonium-salt-water-ammonia fertilizer solution produced in reaction chamber 4 passes via line 10 to any conventional means (not shown) for adding liquid fertilizers to the soil. When the ammonia reactant is hydrogen peroxide solution, the process is, with the following exceptions, identical to that described above:

(1) The aqueous solution formed in reaction chamber 4 comprises a solution of ammonia; no ammonium salt is formed because ammonia is not consumed in the reaction:

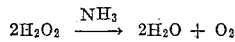

$$2H_2O_2 \xrightarrow{NH_3} 2H_2O + O_2$$

(2) The oxygen produced goes with the ammonia vapor through line 8 and temperature regulator 9 to the crop-contacting device.

(3) Temperature regulator 9 activates peroxide flow regulator 6 via conventional connecting means 40—increasing the flow of peroxide when the temperature is too low and decreasing the flow when the temperature is too high.

When using an aqueous solution of acid as ammonia reactant in the indirect heating process of FIGURE 2, liquid ammonia from cylinder 15 passes to T 17 where a portion of the liquid ammonia is diverted to line 18 and thence through the tubes of heat exchanger, or subcooler, 19. Liquid ammonia passing through the tubes of heat exchanger 19 is cooled below saturation against flashing ammonia entering the shell of heat exchanger 19 from line 16, thereby facilitating the accurate metering of the thus cooled liquid ammonia. Said cooled liquid ammonia passes from heat exchanger 19 via line 21 through flow regulator 22 into reaction chamber 23 where it is contacted with a stoichiometrically equivalent quantity of acid solution. Said acid solution passes from tank 24 through flow regulator 25 and line 26 to reaction chamber 23. The liquid ammonia and acid solution react exothermally in chamber 23 to produce a hot solution of the ammonium salt of the acid. Said hot solution passes, via line 27, into the shell of heat exchanger 28 and then to the soil via pressure regulator 29 and line 30. Line 30 leads to any conventional means (not shown) for adding liquid fertilizers to the soil. Flashing ammonia from the shell of heat exchanger 19 passes via line 20 into the tubes of heat exchanger 28 where it is converted to dry superheated ammonia vapor. Said vapor passes from the heat exchanger via line 31 through temperature regulator 32 and flow regulator 33 to a device for contacting row crops with ammonia vapor. Temperature regulator 32 activates flow regulators 22 and 25 via conventional connecting means 41, 42, and 43—sending more reactants to chamber 23 if the temperature of the ammonia vapor is too low and less reactants if the temperature is too high. We prefer to keep the temperature of ammonia vapor exit heat exchanger 28 in the range of about 27–38° C. When feeding concentrated hydrogen peroxide solution, rather than acid solution to reaction chamber 23, the process is, with the following exceptions, identical to that described above:

(1) Hydrogen peroxide and ammonia are not added in stoichiometrically equivalent quantities, because the ammonia simply increases the pH of the $H_2O_2$ solution, thereby initiating the exothermal decomposition of the peroxide. Studies leading to this invention show that preferred results are obtained when 90% hydrogen peroxide and anhydrous ammonia are mixed in a weight ratio of about 5–6:1, and that the decomposition of 100 pounds of hydrogen peroxide will furnish sufficient heat to vaporize about 250 pounds of ammonia. Temperature regulator 32 activates ammonia flow regulator 22 and hydrogen peroxide flow regulator 25.

(2) The aqueous solution formed in reaction chamber 23 comprises a solution of ammonia; no ammonium salt is formed, because ammonia is not consumed in the reaction:

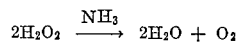

$$2H_2O_2 \xrightarrow{NH_3} 2H_2O + O_2$$

(3) The thus produced oxygen leaves reaction chamber 23 via valve 34, flow regulator 35, and line 36.

Acids which are satisfactory for use in our process include but are not limited to sulfuric acid, hydrochloric acid, phosphoric acid, carbon dioxide, acetic acid, and propionic acid. For economic reasons we prefer to use these acids in fairly concentrated solutions, but more dilute solutions may be used.

The following table shows our preferred ammonia reactants and the preferred concentration of each.

| Ammonia reactant: | Preferred concentration weight percent |
|---|---|
| Sulfuric acid | *48 |
| Hydrochloric acid | *21 |
| Nitric acid | *63 |
| Phosphoric acid | *34 |
| Hydrogen peroxide | 90 |

*The use of more concentrated acid solutions is not satisfactory, because the precipitation of solid salts may plug the reaction chamber or other parts of our apparatus.

Work leading to the development of our process showed that stainless steel type 304 is a preferred material for use in fabricating the reaction chamber and heat exchanger used in our process, because it is relatively inexpensive, resistant to corrosion by our solutions, and has no catalytic effect on the stability of ammonia in the temperature range prevailing in our system. We prefer, as a result of this discovery, to construct the apparatus of our invention from type 304 stainless steel. Other materials suitable for use in constructing our apparatus include, but are not limited to, Hastelloy C, Monel, Inconel type 316 stainless steel, and Hastelloy B.

The 1950 edition of "Chemical Engineers' Handbook," John H. Perry, Editor, McGraw-Hill Book Company, Inc., pp. 1529–1530 gives the following as the composition of the above-listed trademarked materials:

| Material: | Composition, percent |
|---|---|
| Hastelloy B | Ni; 24–32 Mo; 3–7 Fe; 0.02–0.12 C. |
| Hastelloy C | Ni; 14–19 Mo; 4–8 Fe; 0.04–0.15 C.; 12–16 Cr; 3–5.5 W. |
| Inconel | 79.5 Ni; 13 Cr; 6.5 Fe; 0.08 C.; 0.2 Cu; 0.25 Mn. |
| Monel | 67 Ni; 30 Cu; 1.4 Fe; 0.1 Si; 0.15 C. |

EXAMPLE I

Using the direct heating process of FIGURE 1, with the vaporization apparatus mounted upon a defoliator, liquid anhydrous ammonia was fed into the reaction chamber at about 470 pounds per hour, and about 630 pounds per hour of about 63 weight percent nitric acid solution was fed into the reaction chamber while moving the defoliator along a cotton row at about 4 miles per hour. Under these conditions ammonia vapor was evolved from the reaction chamber and was applied to the crop row at the rate of about 90 pounds per acre, and nitrogen fertilizer solution formed in the reaction chamber was applied to the soil at the rate of about 80 pounds of nitrogen per acre. The leaves of cotton plants exiting the hood of the defoliator were lighter green than those of untreated plants. The treated leaves turned bronze within about ½ hour after being contacted with ammonia, and defoliation was ≅ca. 95%, i.e., at least about 95%, complete about 7 days after applying the ammonia.

EXAMPLE II

The run described in Example I was repeated, but the nitric acid solution was replaced with about 90 weight percent hydrogen peroxide solution. Liquid anhydrous ammonia was fed into the reaction chamber at about 310 pounds per hour and the hydrogen peroxide solution was fed into the chamber at about 120 pounds per hour while moving the defoliator along a soy bean row at about 4 miles per hour. Under these conditions ammonia vapor was applied to the crop row at the rate of about 90 pounds per acre and nitrogen fertilizer solution formed in the reaction chamber was applied to the soil at the rate of about 7 pounds of nitrogen per acre. Defoliation of the bean plants was ≅ca. 96% complete 10 days after applying the ammonia.

EXAMPLE III

The indirect heating process of FIGURE 2 was used in this run. The ammonia vaporizer was mounted on a defoliator and moved along a cotton row at about 4 miles per hour while feeding anhydrous liquid ammonia into the reaction chamber at about 80 pounds per hour. At the same time a stoichiometrically equivalent quantity of about 48 weight percent sulfuric acid was fed into the reaction chamber. Ammonia vapor produced in the heat exchanger of this system was fed to the defoliator at the rate of about 100 pounds per acre, and nitrogen fertilizer solution formed in the reaction chamber was applied to the soil at the rate of about 20 pounds of nitrogen per acre. Defoliation was ≅ca. 96% complete 12 days after applying the ammonia.

While our invention has been described by references to details of certain embodiments, it is not intended that the invention be construed as limited to such details except insofar as such limitations appear in the appended claims.

What is claimed is:

1. A portable apparatus, adapted to be mounted on a tractor, for vaporizing liquid ammonia and simultaneously preparing liquid nitrogenous fertilizer solution comprising in combination a liquid ammonia cylinder communicating, via a line having a flow regulator therein, with a reactor; said reactor having an ammonia vapor discharge line; said line having a temperature regulator therein and being adapted to discharge said vapor within the hood of an ammonia defoliator at a pre-determined rate and at a pre-determined temperature; said reactor having a liquid nitrogenous fertilizer discharge line discharging said fertilizer on the soil; and an ammonia-reactant storage tank communicating with said reactor via a line; said line having a flow regulator communicating with and being controlled by the aforesaid temperature regulator.

2. A portable apparatus, adapted to be mounted on a tractor, for vaporizing liquid ammonia and simultaneously preparing liquid nitrogenous fertilizer solution comprising in combination a liquid ammonia cylinder communicating with a line having a T therein; said T being a liquid ammonia flow diverting means, whereby a first portion of said liquid ammonia is diverted to a tube-side inlet of a first heat exchanger via a line communicating with said T and with said tube-side inlet, and whereby a second portion of said liquid ammonia is diverted to a shell-side inlet of said first heat exchanger via a line communicating with said T and communicating with said shell-side inlet; a line communicating with a shell-side outlet of said first heat exchanger and communicating with a tube-side inlet of a second heat exchanger; said second heat exchanger having a tube-side outlet communicating with an ammonia vapor discharge line; said vapor discharge line having a temperature regulator and a flow regulator therein and being adapted to discharge ammonia vapor within the hood of an ammonia defoliator; a liquid ammonia feed line communicating with a tube-side outlet of said first heat exchanger, said line having a flow regulator therein, said flow regulator communicating with and being controlled by the temperature regulator in the aforesaid ammonia vapor discharge line, said liquid ammonia feed line communicating with a reactor; said reactor having an ammonia-reactant inlet line, said inlet line having a flow regulator therein, said regulator communicating with and being controlled by the temperature regulator in the aforesaid ammonia vapor discharge line, said ammonia-reactant inlet line communicating with an ammonia-reactant storage tank; said reactor having a gas outlet line; said gas outlet line having a valve and a flow regulator therein and being adapted to discharge gaseous reaction products to the atmosphere; said reactor having a liquid outlet line communicating with the shell-side inlet of said second heat exchanger; said second heat exchanger having a shell-side outlet communicating with a liquid nitrogenous fertilizer discharge line having a pressure regulator therein and being adapted to discharge said fertilizer solution to the soil.

References Cited by the Examiner

UNITED STATES PATENTS 2,089,957 8/1937 Harris et al. _____ 23—119 X
2,576,080 11/1951 Tischler _____ 71—2.5

(Other references on following page)

UNITED STATES PATENTS

| | | | |
|---|---|---|---|
| 2,653,077 | 9/1953 | Ogilvie | 23—119 |
| 2,682,728 | 7/1954 | Nisbet | 47—1 |
| 2,701,182 | 2/1955 | Sellers et al. | 23—285 X |
| 2,761,765 | 9/1956 | Matthews | 23—252 X |
| 2,872,297 | 2/1959 | Dugan | 23—285 |
| 2,977,715 | 4/1961 | Lindsay | 47—1.7 |
| 3,028,227 | 4/1962 | Ballestra | 23—285 |
| 3,066,015 | 11/1962 | Palmqvist | 23—285 |
| 3,070,434 | 12/1962 | Turner | 71—54 |
| 3,095,298 | 6/1963 | Fisher | 71—2.2 |

OTHER REFERENCES

Corrosion Handbook, N.Y., John Wiley & Sons, 1948. Pages XXXIII, 266, 267, 268, 283, 292–299, 748–756, 776–779, 799.

Schumb, W. C., et al., Hydrogen Peroxide, N. Y., Reinhold 1955, pp. 401 and 433.

MORRIS O. WOLK, *Primary Examiner*.

THEODORE G. CRAVER, JAMES H. TAYMAN, Jr., *Examiners.*

L. J. BLACKMAR, *Assistant Examiner*.

UNITED STATES PATENT OFFICE
CERTIFICATE OF CORRECTION

Patent No. 3,250,597                                            May 10, 1966

Harry L. Mahl, Jr., et al.

It is hereby certified that error appears in the above numbered patent requiring correction and that the said Letters Patent should read as corrected below.

In the heading to the printed specification, lines 5 and 6, f "assignors to W. R. Grace & Co., New York, N. Y., a corporation of Connecticut" read -- assignors, by mesne assignments, to Chevron Research Company, a corporation of Delaware --.

Signed and sealed this 5th day of September 1967.

(SEAL)
Attest:

ERNEST W. SWIDER                                      EDWARD J. BRENNER
Attesting Officer                                          Commissioner of Patents